(12) United States Patent
Sugiura et al.

(10) Patent No.: US 11,077,905 B2
(45) Date of Patent: Aug. 3, 2021

(54) OIL FILTER DISPOSITION STRUCTURE OF SADDLE-RIDE TYPE VEHICLE

(71) Applicant: HONDA MOTOR CO., LTD., Tokyo (JP)

(72) Inventors: Hiroyuki Sugiura, Wako (JP); Hiroshi Yokota, Wako (JP); Noriyuki Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1486 days.

(21) Appl. No.: 14/940,046

(22) Filed: Nov. 12, 2015

(65) Prior Publication Data

US 2016/0257367 A1 Sep. 8, 2016

(30) Foreign Application Priority Data

Sep. 30, 2014 (JP) .............................. JP2014-200081

(51) Int. Cl.
| | |
|---|---|
| *B62J 31/00* | (2006.01) |
| *F01M 1/10* | (2006.01) |
| *B01D 35/00* | (2006.01) |
| *B62K 11/04* | (2006.01) |
| *F01M 11/03* | (2006.01) |
| *F01M 11/00* | (2006.01) |

(52) U.S. Cl.
CPC ............ *B62J 31/00* (2013.01); *B01D 35/005* (2013.01); *B62K 11/04* (2013.01); *F01M 1/10* (2013.01); *F01M 11/03* (2013.01); *F01M 2011/0029* (2013.01)

(58) Field of Classification Search
CPC ........... B62J 31/00; B62K 11/04; F01M 1/10; F01M 11/03; F01M 11/031; F01M 2011/0029; B01D 35/005
See application file for complete search history.

(56) References Cited

U.S. PATENT DOCUMENTS

| | | | |
|---|---|---|---|
| 4,497,293 A | 2/1985 | Takagi et al. | |
| 6,305,337 B1 * | 10/2001 | Sumi ........................ | F01L 1/02 123/179.25 |
| 2014/0026844 A1 | 1/2014 | Yamashiro et al. | |

FOREIGN PATENT DOCUMENTS

| | | |
|---|---|---|
| DE | 100 09 744 A1 | 9/2000 |
| JP | 08-100655 A | 4/1996 |
| JP | 2014-137001 A | 7/2014 |

* cited by examiner

*Primary Examiner* — Benjamin M Kurtz
(74) *Attorney, Agent, or Firm* — Birch, Stewart, Kolasch & Birch, LLP

(57) ABSTRACT

An oil filter exposed to an outside of an internal combustion engine that may be damaged by a stone or a similar object thrown rearwardly from a front tire. A saddle-ride type vehicle includes a power unit that includes an internal combustion engine and a transmission. The transmission is coupled to the internal combustion engine. A lower portion of the power unit forms an oil reservoir. The power unit includes an oil filter, an actuator, and a transmission mechanism. The actuator is configured to drive the transmission. The transmission mechanism is configured to transmit power from the actuator to the transmission. The oil filter is disposed outside a wall portion of the power unit. The wall portion configures a part of the oil reservoir. The oil filter is disposed adjacent to the wall portion and the actuator.

3 Claims, 7 Drawing Sheets

OIL FILTER DISPOSITION STRUCTURE OF SADDLE-RIDE TYPE VEHICLE

CROSS-REFERENCE TO RELATED APPLICATIONS

The present application claims priority under 35 USC 119 to Japanese Patent Application No. 2014-200081 filed Sep. 30, 2014 the entire contents of which are hereby incorporated by reference.

BACKGROUND OF THE INVENTION

1. Field of the Invention

The present invention relates to a disposition structure of an oil filter used for a saddle-ride type vehicle.

2. Description of Background Art

The following disposition structure of an oil filter is disclosed in FIG. 1 of JP-A No. H08-100655. An oil pan is coupled to a lower portion of an engine. The oil filter is disposed at a portion inwardly depressed at the side surface of the oil pan along the outer surface of the oil pan. The oil filter is directly mounted to a lower surface of a crankcase. With the disposition structure of the oil filter disclosed in JP-A No. H08-100655, the right side and the rear side of the oil filter, which is disposed at the lower portion of the engine, are protected by being covered with the outer surface of the oil pan.

However, in the case of an oil filter with the disposition exposed at an outside of an engine, the disposition of the oil filter disclosed in JP-A No. H08-100655 does not cover the front side and the left side of the oil filter. Thus, it cannot be said that the application of such a structure to a saddle-ride type vehicle sufficiently protects the oil filter against a collision of a stone or a similar object that may be thrown rearwardly from a front wheel. To solve this, protection of the oil filter with a simple structure without an increase in the number of components is desirable.

SUMMARY AND OBJECTS OF THE INVENTION

The present invention is to solve the problem. An object of an embodiment of the present invention is to protect an oil filter with the disposition exposed to an outside of an internal combustion engine from a stone or a similar object.

According to an embodiment of the present invention, the saddle-ride type vehicle includes a power unit with an internal combustion engine and a transmission. The transmission is coupled to the internal combustion engine. A lower portion of the power unit forms an oil reservoir. The power unit includes an oil filter, an actuator, and a transmission mechanism. The actuator is configured to drive the transmission. The transmission mechanism is configured to transmit power from the actuator to the transmission. The oil filter is disposed outside a wall portion of the power unit. The wall portion configures a part of the oil reservoir. The oil filter is disposed adjacent to the wall portion and the actuator.

According to an embodiment of the present invention, not only the wall portion, which configures a part of the adjacent oil reservoir, but also the adjacent actuator protects the oil filter. This allows for the protecting of the oil filter from a stone or a similar object with a simple structure.

According to an embodiment of the present invention, the transmission mechanism is disposed between a front wheel of the saddle-ride type vehicle and the oil filter. The actuator is disposed at a rear of the transmission mechanism. The oil filter is disposed adjacent to a sidewall facing a vehicle lateral side among the wall portions.

According to an embodiment of the present invention, the transmission mechanism and the adjacent actuator covers at least a part of the front portion of the oil filter, hiding the oil filter from the front wheel. Thus, the wall portion protects the one lateral side of the oil filter. The transmission mechanism and the actuator, which cover the front portion of the oil filter, prevent a stone from being thrown rearwardly from the front wheel, also protecting the front portion. This ensures protecting the oil filter with more certainty. Furthermore, the transmission mechanism prevents a stone from being thrown rearwardly from the front wheel to the actuator, also ensuring the protection of the actuator.

According to an embodiment of the present invention, an exhaust pipe is coupled to the power unit. The exhaust pipe extends downwardly of a vehicle. The exhaust pipe is disposed adjacent to the oil filter outward in a vehicle-width direction.

According to an embodiment of the present invention, the exhaust pipe covers the lateral side of the oil filter outward in the vehicle-width direction. Accordingly, the transmission mechanism and the actuator protect the front portion, and the wall portion protects the lateral side inward in the vehicle-width direction. Additionally, the exhaust pipe protects the lateral side outward in the vehicle-width direction. This surrounds the oil filter from the three directions, ensuring the reliable protection of the oil filter.

According to an embodiment of the present invention, the transmission mechanism includes a plurality of gears configured to transmit a driving power from the actuator to the transmission. The pluralities of the gears are disposed by orienting turning shaft lines of the gears in a vehicle front-rear direction.

According to an embodiment of the present invention, the gears of the transmission mechanism are disposed in front of the oil filter and are disposed so as to expand their side surfaces to the front of the oil filter. This expands the area of the transmission mechanism occupying the front surface of the oil filter. Thus, the transmission mechanism, which widely covers the front of the oil filter, prevents a stone from being thrown rearwardly from the front wheel, to ensure the protection of the oil filter with more certainty.

According to an embodiment of the present invention, a part of the sidewall is formed as a bulge portion. The bulge portion bulges outwardly in a vehicle-width direction. The oil filter is disposed at a front of a front sidewall of the bulge portion. The oil filter is disposed adjacent to the front sidewall.

According to an embodiment of the present invention, the front sidewall, which is the wall portion configuring a part of the oil reservoir, of the bulge portion covers the rear side of the oil filter. The bulge portion protects the rear of the oil filter, ensuring protecting the oil filter as a whole.

The oil filter is disposed adjacent to the outside of the wall portion forming a part of the oil reservoir and the actuator. Accordingly, not only the wall portion, which configures a part of the oil reservoir, but also the adjacent actuator protects the oil filter. This allows for the protection of the oil filter from a stone or a similar object with a simple structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
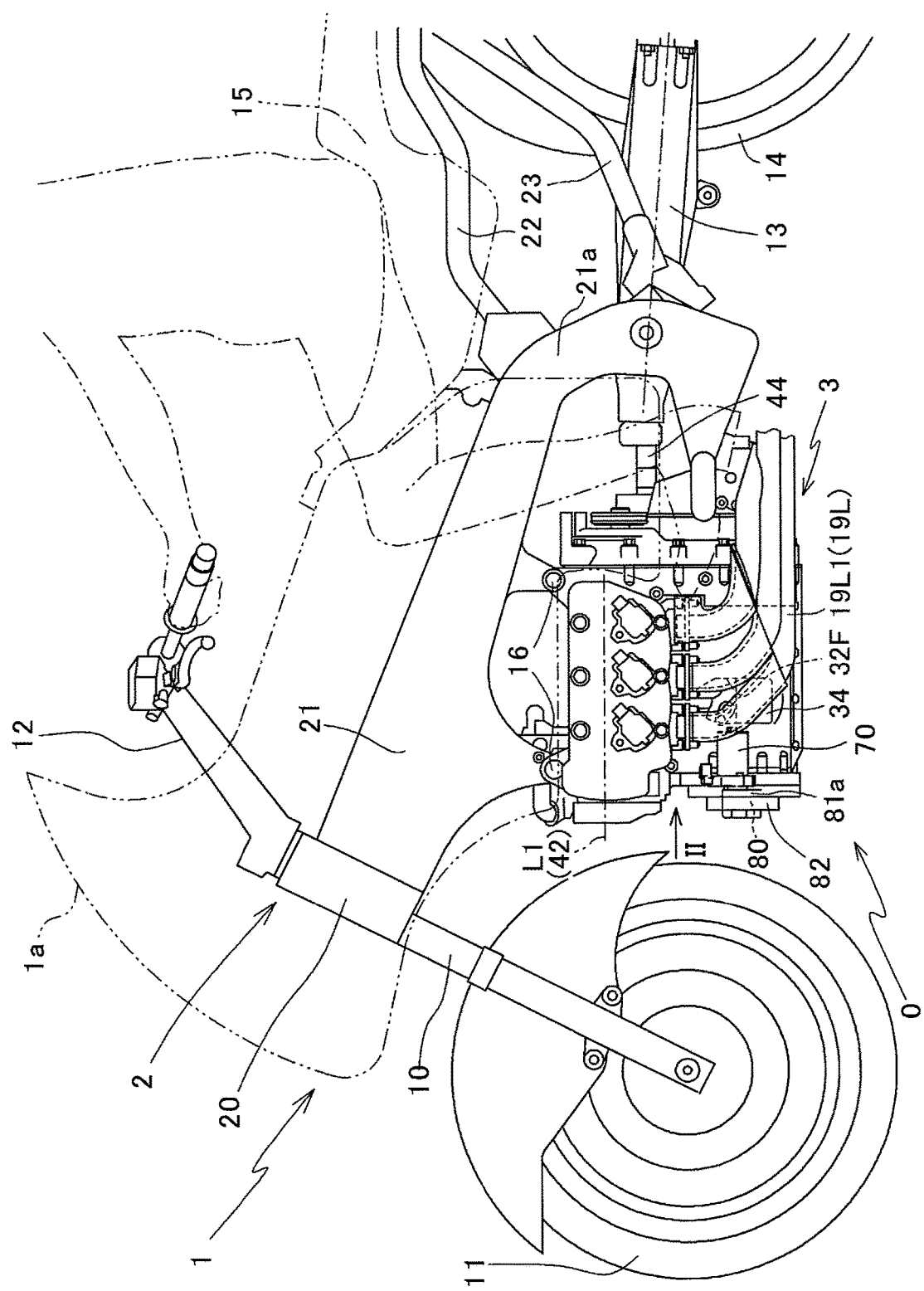
FIG. 1 is a right side view of a saddle-ride type vehicle with an oil filter disposition structure of the saddle-ride type vehicle according to one embodiment of the present invention.

The following describes an oil filter disposition structure of a saddle-ride type vehicle according to one embodiment of the present invention using the drawings. Front, rear, left, right, upper, and lower directions in the following description follow the orientation of the saddle-ride type vehicle. In the drawings, arrows FR, RE, LT, and RT indicate the front side, the rear side, the left side, and the right side, respectively.

FIG. 1 is a right side view of a saddle-ride type vehicle 1 with an oil filter disposition structure 0 of the saddle-ride type vehicle according to one embodiment of the present invention. FIG. 1 shows a vehicle body cover 1a of the saddle-ride type vehicle 1 simplified with a two-dot chain line. FIG. 1 omits a part of an intake system, a fuel system, an exhaust system, and a similar system, illustrating only the main part.

A body frame 2 of the saddle-ride type vehicle 1 includes a head pipe 20, which is disposed at the front portion of the vehicle body, a main frame 21, a seat rail 22, and a back stay 23. The main frame 21 extends slightly obliquely downwardly to the rear from the head pipe 20. The main frame 21 then goes through a flexed portion 21a, and the end portion of the main frame 21 extends downwardly. The seat rail 22 extends from the flexed portion 21a of the main frame 21 to slightly obliquely upwardly to the rear. The back stay 23 couples the rear portion of the seat rail 22 and the lower portion of the flexed portion of the main frame 21.

A front fork 10 is steerably mounted to the head pipe 20. A front wheel 11 is rotatably supported to the lower end of the front fork 10. A steering handlebar 12 is coupled to the upper end of the front fork 10. The front end portion of a swing arm 13 is swingably supported vertically to the lower portion of the flexed portion 21a of the main frame 21. A rear wheel 14, which is a driving wheel, is rotatably supported to the rear end portion of the swing arm 13.

A shock absorber (not shown) is coupled between the flexed portion 21a of the main frame 21 and the swing arm 13. An occupant seat 15 is mounted to the upper portion of the seat rail 22.

A power unit 3, which drives the rear wheel 14, is disposed underneath the main frame 21. The power unit 3 orients a rotating shaft line L1 of a crankshaft 42 in a front-rear direction. A plurality of mounting brackets 16 support the power unit 3 to the main frame 21. A drive shaft 44 is coupled to the rear portion of the power unit 3. The drive shaft 44 is disposed along the swing arm 13.

Figure 2:
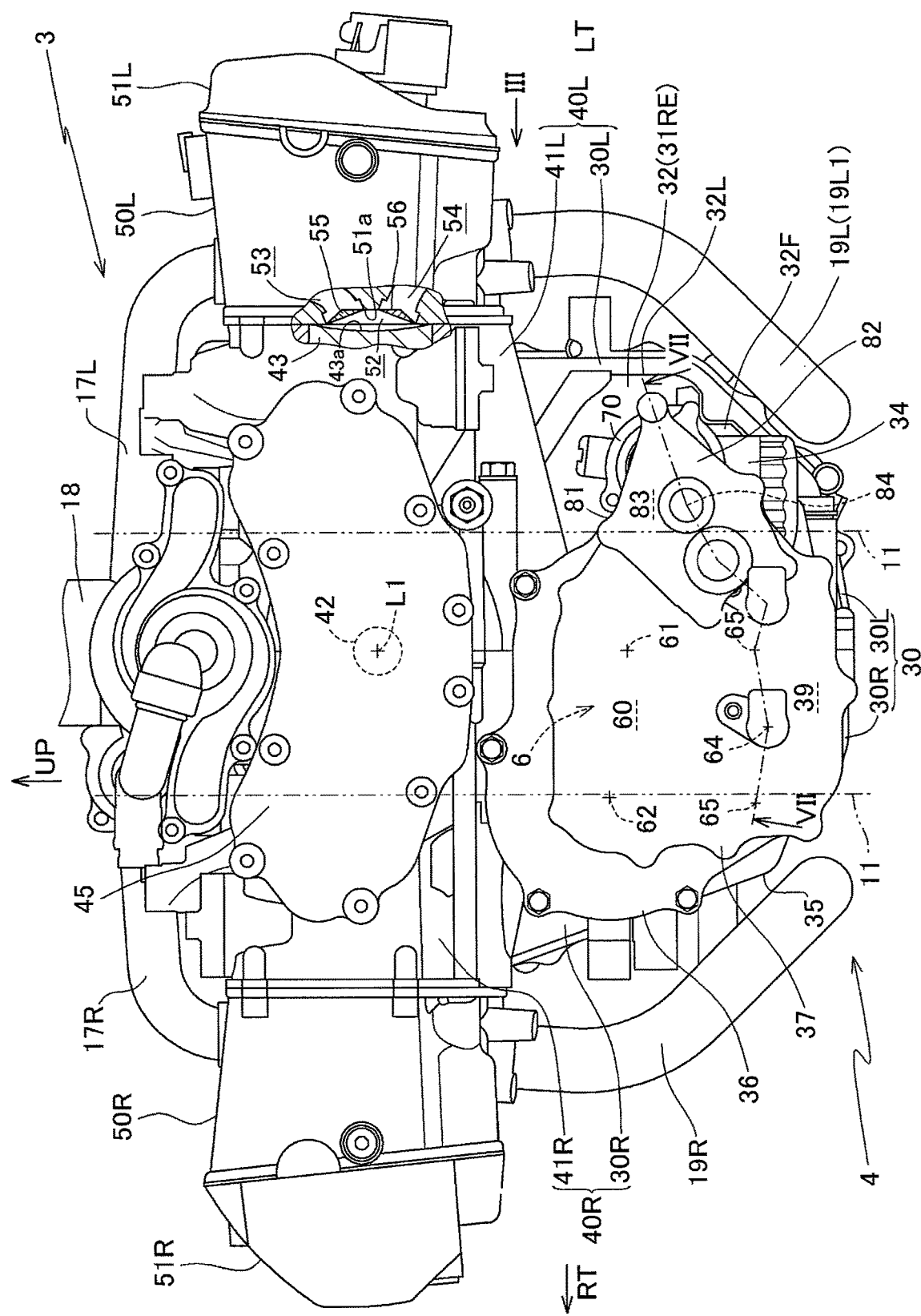
FIG. 2 is a front view of a power unit viewed from arrow II in FIG. 1.

FIG. 2 is a front view of the power unit 3 viewed from the arrow II in FIG. 1. FIG. 2 simplifies the illustration of the front wheel 11 in the two-dot chain line. FIG. 2 shows the cross section where a part of the power unit 3 is cut out. As shown in FIG. 1 and FIG. 2, the power unit 3 includes a four-stroke, water-cooled, six-cylinder, horizontally opposed internal combustion engine 4 and a transmission 6 coupled to the internal combustion engine 4. As shown in FIG. 2, the internal combustion engine 4 includes an engine block 40, which includes a left engine block half body 40L and a right engine block half body 40R, left and right cylinder heads 50L and 50R, and left and right head covers 51L and 51R. The left engine block half body 40L is disposed on the left side in a state of facing the front in a travelling direction of the saddle-ride type vehicle 1. The right engine block half body 40R is disposed on the right side in a state of facing the front in the travelling direction. The left and right cylinder heads 50L and 50R are each coupled to the left and right ends of the left and right engine block half bodies 40L and 40R. The left and right head covers 51L and 51R are superimposed on the cylinder heads 50L and 50R, respectively.

The left engine block half body 40L includes a left cylinder block 41L and a left crankcase half body 30L. The left crankcase half body 30L is integrally formed with the left cylinder block 41L. The right engine block half body 40R includes a right cylinder block 41R and a right crankcase half body 30R. The right crankcase half body 30R is integrally formed with the right cylinder block 41R. The left crankcase half body 30L and the right crankcase half body 30R configure the crankcase 30.

The crankshaft 42 orients its rotating shaft line L1 in the front-rear direction of the saddle-ride type vehicle 1. The crankshaft 42 is rotatably supported between the left crankcase half body 30L and the right crankcase half body 30R, which are positioned above the engine block 40. A front cover 45 is mounted to the upper front surface of the engine block 40. The front cover 45 covers the upper front surface of the engine block 40 placing the crankshaft 42 as its center.

In a space surrounded by the left and right crankcase half bodies 30L and 30R under the engine block 40, a main shaft 61, a countershaft 62, a shift drum 64, and a shift fork shaft 65 of the transmission 6 are disposed. A transmission holder 36 is mounted to the left and right crankcase half bodies 30L and 30R so as to cover the front surface of the transmission 6. A transmission chamber 60 is formed in a space surrounded by the transmission holder 36 and the left and right crankcase half bodies 30L and 30R, which are under the engine block 40. The transmission chamber 60 houses the transmission 6. An oil reservoir 39, which will be described later, is formed at the lower region of the transmission chamber 60.

A shift transmission mechanism holder 37 is mounted on the front surface of the transmission holder 36. The shift transmission mechanism holder 37 holds a shift transmission mechanism 90. The shift transmission mechanism 90 operates the shift position of the transmission 6 from the center to the lower portion of the transmission holder 36. Furthermore, in the vehicle front view, a transmission mechanism holding portion 81 is integrally formed with a left end portion 37L of the shift transmission mechanism holder 37.

A transmission mechanism cover 82 is mounted to the front surface of the transmission mechanism holding portion 81 of the shift transmission mechanism holder 37. A space surrounded by the transmission mechanism holding portion 81 and the transmission mechanism cover 82 forms a transmission mechanism chamber 83. The transmission mechanism chamber 83 internally includes a transmission gear group 84, which will be described later, of the transmission mechanism 80.

The internal combustion engine 4 includes a combustion chamber 52. The combustion chamber 52 is formed by a top end surface 43a of a piston 43 and a combustion chamber superior wall surface 50a disposed under a cylinder head 50. An intake port 53 and an exhaust port 54, which are formed in the cylinder head 50, are continuous with the combustion chamber 52. An intake valve 55 is mounted to the end portion of the intake port 53 on the combustion chamber side. An exhaust valve 56 is mounted to the end portion of the exhaust port 54 on the combustion chamber side. An ignition plug (not shown) is mounted to the combustion chamber superior wall surface 50a so as to face the combustion chamber 52. The piston 43 is positioned to be slidable back and forth in the engine block 40. The piston 43 is coupled to the crankshaft 42 via a connecting rod (not shown). In conjunction with the sliding of the piston 43, which is caused by burning in the combustion chamber 52, the crankshaft 42 is rotatively driven.

A left intake pipe 17L and a right intake pipe 17R are coupled to the top of the left and right cylinder heads 50L and 50R, respectively. The left intake pipe 17L and the right intake pipe 17R are coupled to the intake port 53. The left and right intake pipes 17L and 17R are bent inwardly in the vehicle-width direction at the top of the power unit 3. The left and right intake pipes 17L and 17R are coupled to a manifold 18 at the top of the power unit 3.

Figure 3:
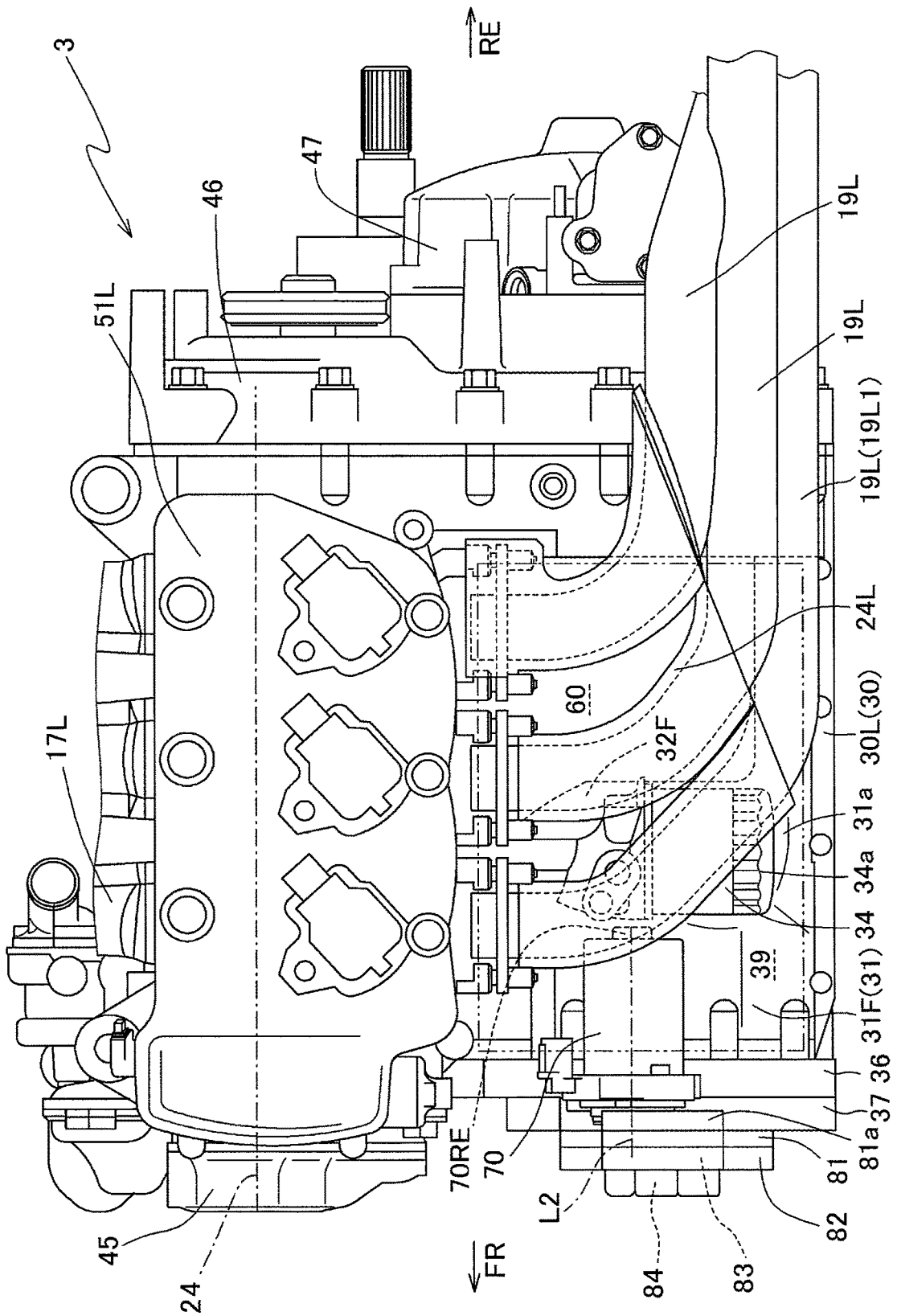
FIG. 3 is a right side view of the power unit viewed from arrow III in FIG. 2.

FIG. 3 is a right side view of the power unit 3 viewed from the arrow III in FIG. 2. In FIG. 3, the spaces surrounded by the two-dot chain lines show the transmission chamber 60 and the oil reservoir 39, which is positioned under the transmission chamber 60. As shown in FIG. 2 and FIG. 3, three left exhaust pipes 19L, which are coupled to the exhaust port 54, are coupled to the lower portion of the left cylinder head 50L. Additionally, three right exhaust pipes 19R (only one is shown), which are coupled to the exhaust port 54, are coupled to the lower portion of the right cylinder head 50R. The left and right exhaust pipes 19L and 19R extend downwardly from the lower portions of the left and right cylinder heads 50L and 50R and are then bent to extend obliquely downwardly to the rear and to the center in the vehicle-width direction. The left and right exhaust pipes 19L and 19R extend to the rear along the outer wall surface of the crankcase 30 at the lower portion of the power unit 3 and are coupled to an exhaust muffler (not shown), which is disposed at the rear portion of the vehicle. A left exhaust pipe cover 24L is disposed at a predetermined region from the cylinder head 50 on the left exhaust pipe 19L. A right exhaust pipe cover (not shown) is disposed at a predetermined region from the cylinder head 50 on the right exhaust pipe 19R. The left exhaust pipe cover 24L and the right exhaust pipe cover block heat at a high temperature portion of the exhaust pipe upstream of the left and right exhaust pipes 19L and 19R (the cylinder head 50 side).

Figure 4:
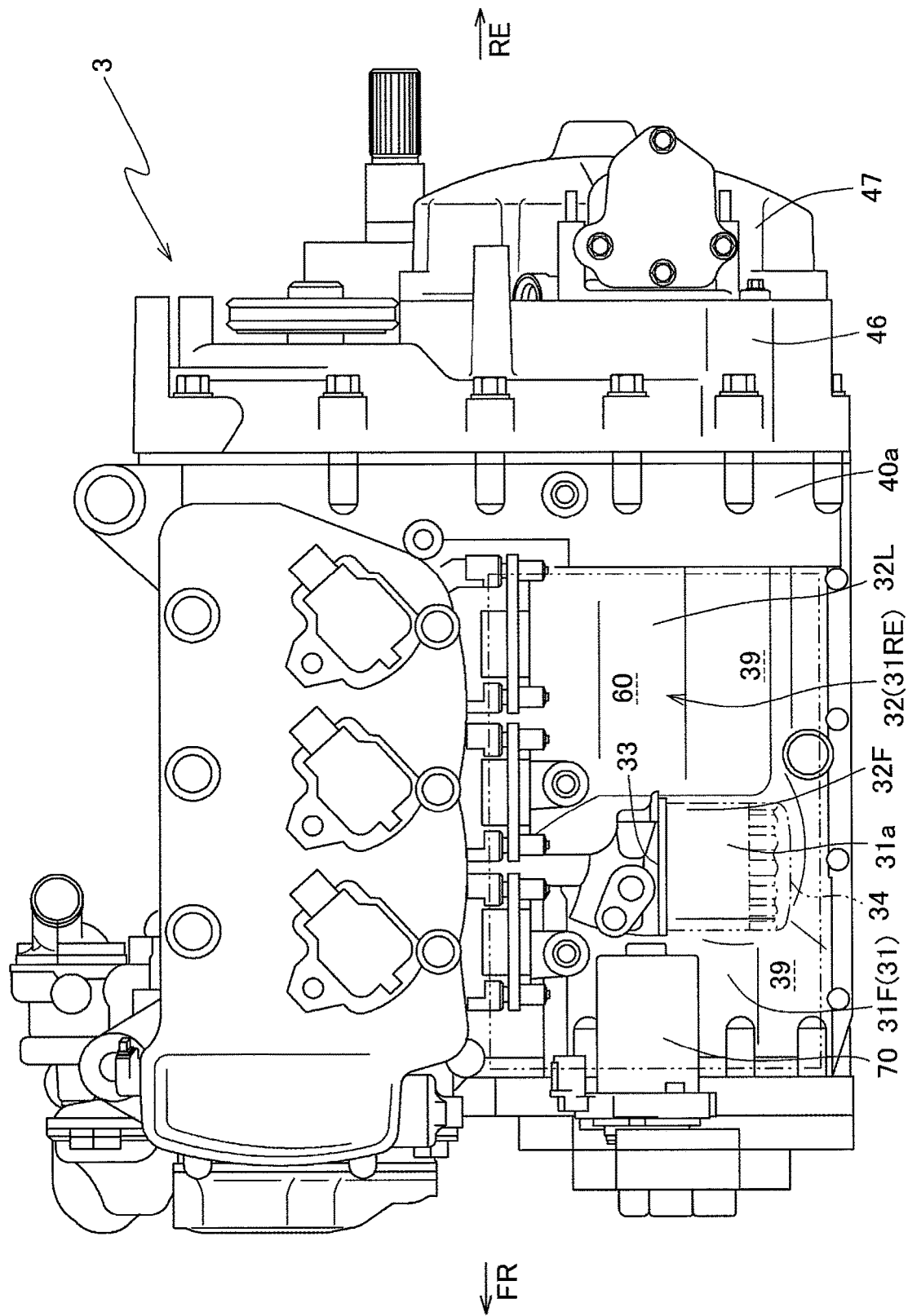
FIG. 4 is a right side view in a state where an exhaust pipe and an oil filter of the power unit in FIG. 3 are removed.
Figure 5:
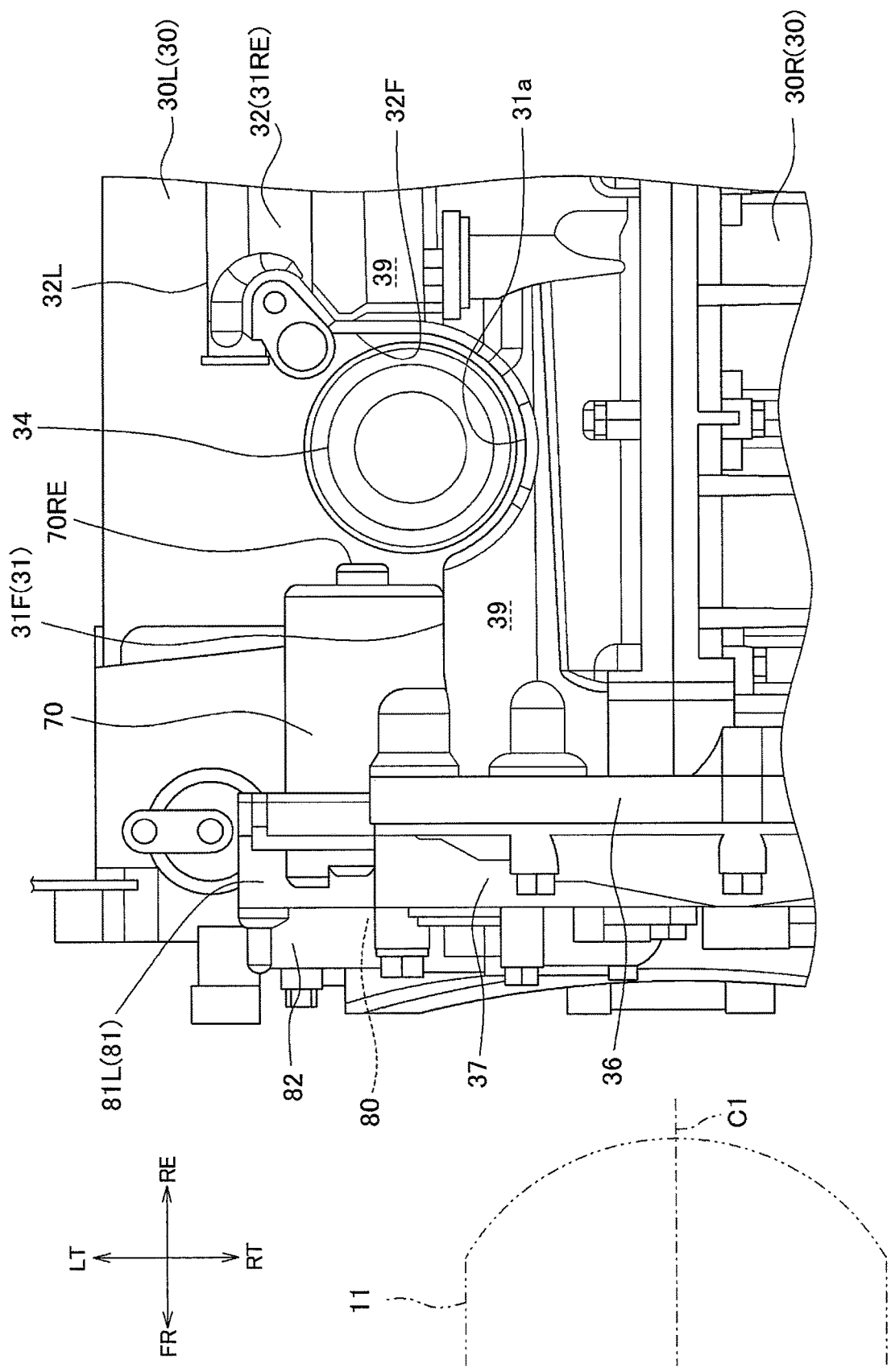
FIG. 5 is a bottom view of the power unit viewed from arrow V in FIG. 4.

FIG. 4 is a right side view where the left intake and exhaust pipes 17L and 19L of the power unit 3 in FIG. 3 are removed and a part of the power unit 3 is omitted. FIG. 5 is a bottom view of the crankcase 30 viewed from the arrow V in FIG. 4. FIG. 5 simplifies the illustration of the front wheel 11 by the two-dot chain line. As shown in FIG. 4, a flange portion 40a is formed at the rear of the engine block 40. A rear cover 46 is mounted to the rear of the flange portion 40a. A clutch cover 47 is also mounted to the rear center portion at the lower portion of the rear cover 46.

As shown in FIG. 4 and FIG. 5, among a left sidewall 31, which configures a part of the left crankcase half body 30L and faces the left side of the vehicle, the left sidewall 31 of a rear half portion 31RE (hereinafter referred to as the rear half portion left sidewall 31RE) is formed as a bulge portion 32. The bulge portion 32 bulges to the left, outwardly in the vehicle-width direction.

The bulge portion 32 includes a left sidewall 32L of the bulge portion 32 (hereinafter referred to as the bulge portion left sidewall 32L) and a front sidewall 32F of the bulge portion 32 (hereinafter referred to as the bulge portion front sidewall 32F). The rear portion of the bulge portion 32 is integrated with the flange portion 40a of the engine block 40. The bulge portion front sidewall 32F is formed on a surface approximately perpendicular to the vehicle front-rear direction in the vehicle lower view. As shown in FIG. 2, the upper portion of the bulge portion left sidewall 32L is inclined obliquely to the right and upwardly in the vehicle front view. The lower portion of the bulge portion left sidewall 32L is inclined obliquely to the right and downwardly.

As described above, the lower region of the space surrounded by the left and right crankcase half bodies 30L and 30R is covered with the transmission holder 36 and the rear cover 46 by the front and the rear, forming the oil reservoir 39. A part of the oil reservoir 39 is configured with a front half portion left sidewall 31F, the bulge portion front sidewall 32F, and the bulge portion left sidewall 32L of the left crankcase half body 30L. An oil pump (not shown) is housed in the rear portion inside the bulge portion 32. The oil accumulated in the oil reservoir 39 is sucked by the oil pump via a strainer (not shown).

As shown in FIG. 4, an oil filter mounting portion 33 is formed at a boundary between the left sidewall 31F of the front half portion 31F (hereinafter referred to as the front half portion left sidewall 31F) and the bulge portion front sidewall 32F of the left crankcase half body 30L at the part close to the center in the vertical direction. The oil filter mounting portion 33 protrudes from the front half portion left sidewall 31F and the bulge portion front sidewall 32F of the left crankcase half body 30L to the left front in the horizontal direction. With reference to FIG. 5, a recess 31a is formed at a region positioned underneath the oil filter mounting portion 33 among the front half portion left sidewall 31F of the left crankcase half body 30L. The recess 31a is arcuately recessed to the center in the vehicle-width direction in the vehicle lower view.

As shown in FIG. 3 to FIG. 5, an oil filter 34 is mounted to the oil filter mounting portion 33 from the lower portion of the oil filter mounting portion 33 so as to go along the recess 31a. In the oil filter 34, about one-third of the right side of the oil filter 34 is fitted to the recess 31a providing a gap. The recess 31a is formed at the front half portion left sidewall 31F of the left crankcase half body 30L. The oil filter 34 is disposed adjacent to the front of the bulge portion front sidewall 32F providing a gap with the bulge portion front sidewall 32F. In this manner, the oil filter 34 is disposed adjacent to the front half portion left sidewall 31F. The rear portion of the oil filter 34 is also disposed adjacent to the bulge portion front sidewall 32F. Accordingly, the crankcase 30, which is partially configured of the oil reservoir 39, and the bulge portion 32 (namely, the crankcase 30) protect the right lateral side and the rear side of the oil filter 34. The oil discharged from the oil pump is filtered via the oil filter 34. Then, the oil is supplied to each oil passage (not shown) in the power unit 3. Furthermore, the crankcase 30 covers about one-third of the front right side of the oil filter 34. Accordingly, the crankcase 30 protects a part of the front portion.

As shown in FIG. 2 and FIG. 3, among the three left exhaust pipes 19L coupled to the left cylinder head 50L, a first left exhaust pipe 19L1, which is positioned at the frontmost, extends across from the front upper portion to the rear lower portion of the oil filter 34 so as to overlap the oil filter 34 as viewed in the side view of the vehicle. The first left exhaust pipe 19L1 is disposed adjacent to the left lower portion of the oil filter 34 in the vehicle front view. With such a disposition of the first left exhaust pipe 19L1, the first left exhaust pipe 19L1 covers the left side of the oil filter 34 for protection.

Figure 6:
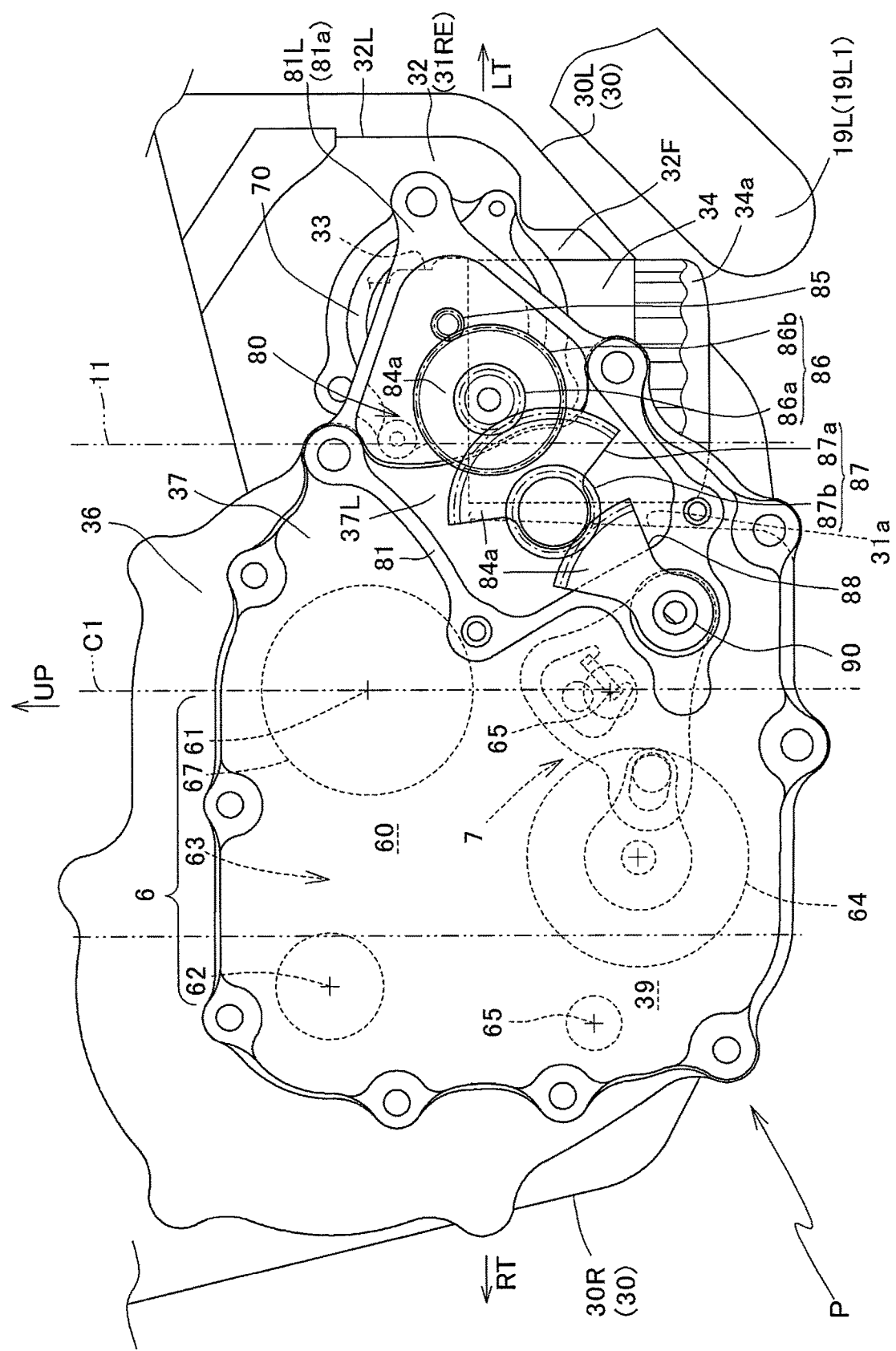
FIG. 6 is an enlarged front view in a state where the lower portion of the power unit in FIG. 2 is enlarged and a cover of a transmission mechanism is removed.
Figure 7:
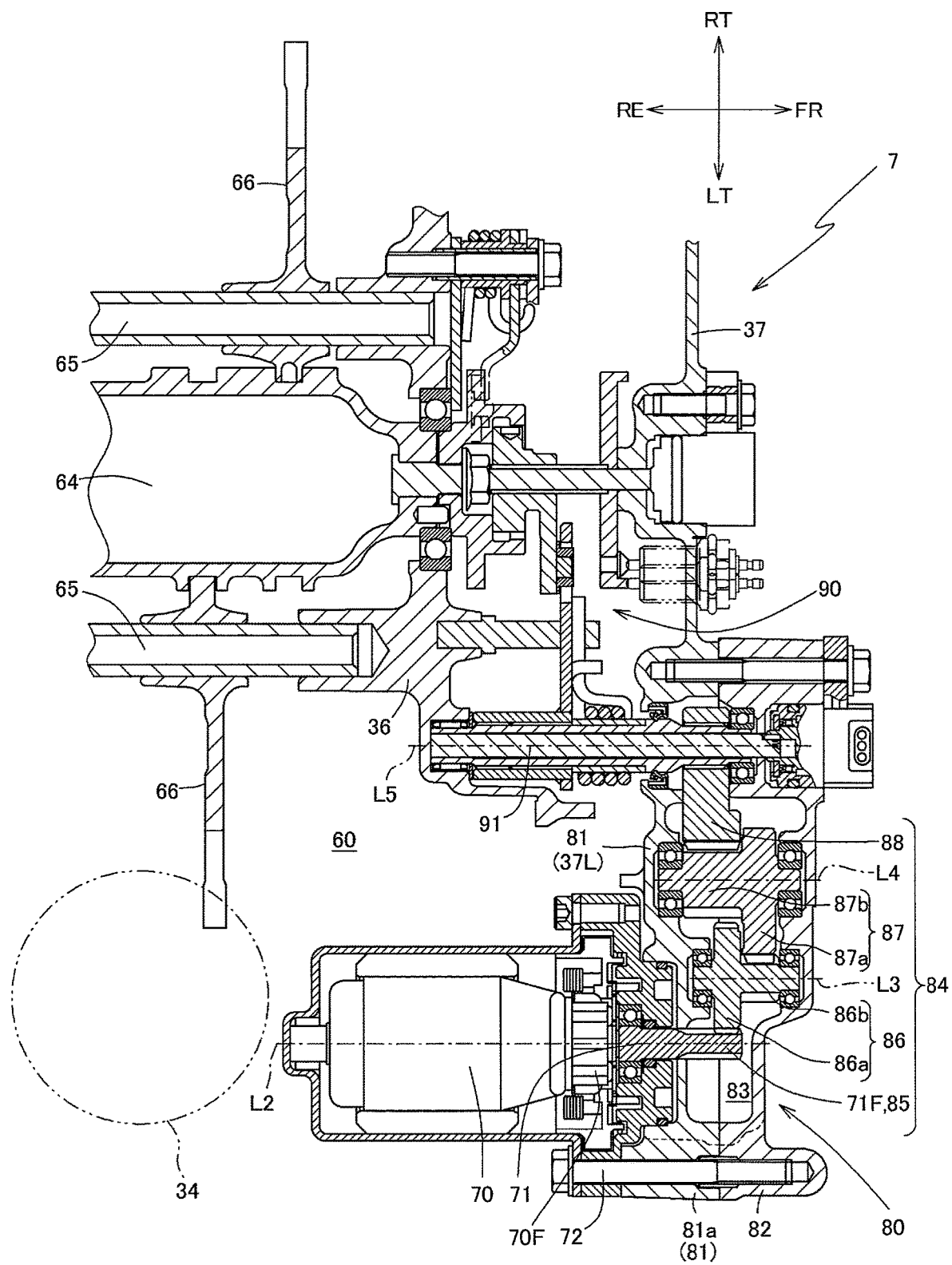
FIG. 7 is a cross-sectional view of a shift drive mechanism viewed from arrow VII-VII in FIG. 2.

FIG. 6 is an enlarged front view in a state where the lower portion of the power unit 3 in FIG. 2 is enlarged and the transmission mechanism cover 82 is removed. FIG. 6 simplifies the illustration of the front wheel 11 in the two-dot chain line. FIG. 7 is a cross-sectional view taken along the VII-VII line in FIG. 2. FIG. 7 simplifies the illustration of the oil filter 34 in the two-dot chain line. As shown in FIG. 6 and FIG. 7, a shift drive mechanism 7 is disposed at the front of the power unit 3. The shift drive mechanism 7 includes an actuator 70, a transmission mechanism 80, and the shift transmission mechanism 90. A power supplied from the actuator 70 is transmitted to the shift transmission mechanism 90 via the transmission mechanism 80. An action by the shift transmission mechanism 90 intermittently turns the shift drum 64. Through a shift fork 66, the shift position of the transmission 6 is selectively established.

As shown in FIG. 6, the transmission chamber 60, which is surrounded by the left and right crankcase half bodies 30L and 30R, houses the transmission 6. The transmission 6 includes the main shaft 61, the countershaft 62, a gear shift mechanism 63, and a clutch mechanism 67. The gear shift mechanism 63 is disposed at the main shaft 61 and the countershaft 62. The gears of the gear shift mechanism 63, which is mounted to the main shaft 61 and the countershaft 62, paired to one another are mutually engaged. The gears are fitted to the main shaft 61 and the countershaft 62 with splines and serve as shifters. The gears are shifted by the movement of the gears by the shift drive mechanism 7.

As shown in FIG. 6, the above-described transmission mechanism holding portion 81 is formed at the shift transmission mechanism holder 37. A left half portion 81L of the transmission mechanism holding portion 81 protrudes from the transmission holder 36 leftwardly, forming a protruding portion 81a. The protruding portion 81a is diagonally covered from the right lower portion to the left upper portion in front of the oil filter 34 in the vehicle front view.

As shown in FIG. 3, FIG. 6, and FIG. 7, a rear end portion 70RE of the actuator 70 is disposed adjacent to the top of the oil filter 34. The actuator 70 orients its turning shaft line L2 in the front-rear direction. The actuator 70 is mounted to the rear surface of the protruding portion 81a with a bolt 72. In this manner, in the oil filter 34, by mounting the actuator 70 to the protruding portion 81a, the actuator 70 covers the upper half portion of the oil filter 34 in a vehicle front view. Accordingly, the actuator 70 protects the front portion of the oil filter 34. A motor shaft 71 projects from a front end portion 70F of the actuator 70. A front end portion 71F of the motor shaft 71 is passed through to the inside of the transmission mechanism chamber 83, which is formed between the transmission mechanism holding portion 81 and the transmission mechanism cover 82, from the rear of the protruding portion 81a. Accordingly, the actuator 70 is coupled to the transmission mechanism 80.

As shown in FIG. 6 and FIG. 7, in the transmission mechanism holding portion 81, which is formed at the left end portion 37L of the shift transmission mechanism holder 37, the transmission mechanism 80 is disposed. The transmission mechanism 80 includes the transmission gear group 84 and the transmission mechanism cover 82. The transmission gear group 84 includes a drive gear 85, a first gear 86, a second gear 87, and a driven gear 88. The drive gear 85 is integrally formed with the front end portion 71F of the motor shaft 71 of the actuator 70.

In the first gear 86, a first idle gear 86a and a second idle gear 86b, which has a smaller diameter than the first idle gear 86a, are integrally formed. The first gear 86 orients its turning shaft line L3 in the vehicle front-rear direction. The first gear 86 is turnably supported by the transmission mechanism holding portion 81 and the transmission mechanism cover 82. In the second gear 87, a third idle gear 87a, which is a sector gear, and a fourth idle gear 87b, which has a smaller diameter than the third idle gear 87a, are integrally formed. The second gear 87 orients its turning shaft line L4 in the vehicle front-rear direction. The second gear 87 is turnably supported by the transmission mechanism holding portion 81 and the transmission mechanism cover 82. The driven gear 88 is the sector gear. The driven gear 88 is fitted to a shift spindle 91, which is disposed orienting its turning shaft line L5 in the front-rear direction, of the shift transmission mechanism 90. The drive gear 85 and the first idle gear 86a, the second idle gear 86b and the third idle gear 87a, the fourth idle gear 87b and the driven gear 88 are each engaged, configuring the transmission gear group 84, which is the gear group. The transmission mechanism 80 decelerates the rotary drive power by the actuator 70 and then transmits the rotary drive power to the shift transmission mechanism 90.

As described above, the transmission gear group 84 of the transmission mechanism 80 is disposed such that the respective turning shaft lines L2, L3, L4, and L5 are oriented in the vehicle front-rear direction. Thus, a gear side surface 84a, which becomes a surface perpendicular to the first idle gear 86a, the third idle gear 87a, and the driven gear 88 in an axial direction, widely faces the transmission mechanism holding portion 81. This expands the area of the transmission mechanism 80 occupying the front surface of the oil filter 34. With the embodiment, in the vehicle front view, the front right upper portion of the oil filter 34 is widely covered with the first and third idle gears 86a and 87a. Furthermore, the front surface of the transmission gear group 84 is widely covered with the transmission mechanism cover 82, configuring the transmission mechanism 80. The transmission mechanism 80 widely covers the front portion of the oil filter 34 for protection.

As shown in FIG. 2, FIG. 5, and FIG. 6, the transmission mechanism 80 is shifted to the left lateral side in the vehicle-width direction with respect to a widthwise center C1 of the front wheel 11, which is the center of the width direction of the vehicle. Thus, the transmission mechanism 80 is disposed between the oil filter 34 and the front wheel 11. Such a disposition allows for the prevention of a stone or other matter thrown rearwardly from the front wheel 11 from hitting the actuator 70 and the oil filter 34, which are positioned rearwardly of the transmission mechanism 80.

As shown in FIG. 2 and FIG. 5, the front side of the oil filter 34 is disposed adjacent to the transmission mechanism 80 and the actuator 70. The left lateral side of the oil filter 34 is disposed adjacent to the first left exhaust pipe 19L1. The rear side of the oil filter 34 is disposed adjacent to the bulge portion front sidewall 32F, which is a wall portion configuring a part of the oil reservoir 39, of the left crankcase half body 30L. The right lateral side of the oil filter 34 is disposed adjacent to the front half portion left sidewall 31F, which is a wall portion configuring a part of the oil reservoir 39, of the left crankcase half body 30L. Thus, the four directions, front, rear, right, and left directions of the oil filter 34 are surrounded by the transmission mechanism 80, the actuator 70, the crankcase 30, and the first left exhaust pipe 19L1 for protection.

It is to be noted that, in the embodiment, the lower portion of the oil filter 34 is not covered. This allows for the removing of a cap 34a of the oil filter 34 from the lower side, ensuring easily exchanging an internal element. Thus, maintainability is also ensured.

One embodiment of the present invention described above provides the following effects. The oil filter 34 is mounted to the oil filter mounting portion 33 formed at the left crankcase half body 30L. This disposes the oil filter 34 adjacent to the actuator 70 and the front half portion left sidewall 31F, which is a wall portion configuring a part of the oil reservoir 39, of the left crankcase half body 30L. With this construction, not only the crankcase 30 partially configured of the oil reservoir 39, but also the adjacent actuator 70 covers the oil filter 34 for protection. This simple structure allows for the protection of the oil filter 34 from a stone or a similar object.

The transmission mechanism 80 is disposed between the front wheel 11 and the oil filter 34. Accordingly, the crankcase 30 protects the right lateral side of the oil filter 34. The transmission mechanism 80 and the actuator 70 cover the front side of the oil filter 34. Thus, a stone is prevented from being thrown rearwardly from the front wheel 11 to the oil filter 34. This protects the front side, ensuring reliably protecting the oil filter 34 from the two directions. Additionally, the transmission mechanism 80 prevents a stone from being thrown rearwardly from the front wheel 11 to the actuator 70. Thus, the protection of the actuator 70 is achieved.

The plurality of left and right exhaust pipes 19L and 19R, which are coupled to the exhaust port 54, are coupled to the left and right cylinder heads 50L and 50R. Among the left exhaust pipes 19L, the first left exhaust pipe 19L1, which is positioned at the frontmost, extends across from the front upper portion to the rear lower portion of the oil filter 34 so as to overlap the oil filter 34 as viewed from a side view of the vehicle. The first left exhaust pipe 19L1 is disposed adjacent to the left lower portion of the oil filter 34 in the vehicle front view. Thus, as viewed from the side view of the vehicle, the first left exhaust pipe 19L1 covers the left lateral side of the oil filter 34. The transmission mechanism 80 and the actuator 70 protect the front portion of the oil filter 34. The crankcase 30 protects the right lateral side of the oil filter 34. The first left exhaust pipe 19L1 protects the left lateral side of the oil filter 34. This ensures reliably protecting the oil filter 34 from three directions.

The transmission mechanism 80 includes the transmission gear group 84. The transmission gear group 84 is the gear group in which the plurality of gears 85 to 88 engage. The respective gears 85 to 88 orient their turning shaft lines L2 to L5 in the vehicle front-rear direction and are disposed in the transmission mechanism chamber 83. Thus, the side surfaces 84a of the respective gears 85 to 88 widely face the transmission mechanism holding portion 81, which is disposed to partially protrude to the front of the oil filter 34. Covering these gears 85 to 88 with the transmission mechanism cover 82 allows for an increase in the area of the transmission mechanism 80 occupying the front surface of the oil filter 34. This widely covers the front portion of the oil filter 34 with the transmission mechanism 80, allowing for the protection of the front portion with more certainty.

The rear half portion left sidewall 31RE, which is a wall portion configuring a part of the oil reservoir 39, of the left crankcase half body 30L is formed as the bulge portion 32 bulging outwardly in the vehicle-width direction. The oil filter 34 is disposed adjacent to the bulge portion front sidewall 32F. Thus, the bulge portion front sidewall 32F covers the rear side of the oil filter 34. The bulge portion 32 can protect the rear side of the oil filter 34. The transmission mechanism 80 and the actuator 70 surround the front portion of the oil filter 34. The crankcase 30 surrounds the right lateral side of the oil filter 34. The first left exhaust pipe 19L1 surrounds the left lateral side of the oil filter 34. The bulge portion 32 surrounds the rear side of the oil filter 34. This ensures the protection of the oil filter 34 with more certainty.

The embodiment of the present invention is described above referring to the drawings. However, the embodiment is not limited to the above-described descriptions, but can be changed without departing from the spirit of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An oil filter disposition structure of a saddle-ride vehicle comprising:
a power unit including an internal combustion engine and a transmission, the transmission being operatively coupled to the internal combustion engine, a lower portion of the power unit forming an oil reservoir;
wherein the power unit includes an oil filter, an actuator, and a transmission mechanism, the actuator being configured to drive the transmission, the transmission mechanism being configured to transmit power from the actuator to the transmission; and
the oil filter is disposed outside a wall portion of the power unit, the wall portion configuring a part of the oil reservoir, the oil filter being disposed adjacent to the wall portion and the actuator,
wherein said transmission mechanism is disposed between a front wheel of the saddle-ride vehicle and the oil filter, said actuator is disposed at a rear of the transmission mechanism, and said oil filter is disposed adjacent to a sidewall facing a vehicle lateral side;
an exhaust pipe operatively connected to the power unit, the exhaust pipe being coupled to the internal combustion engine, the exhaust pipe being disposed adjacent to the oil filter outwardly in a vehicle-width direction;

said transmission mechanism includes a plurality of gears,
wherein the plurality of gears are configured to transmit a driving power from the actuator to the transmission, and the plurality of the gears are disposed by orienting turning shaft lines of the plurality of gears in a vehicle front-rear direction.

2. The oil filter disposition structure of the saddle-ride vehicle according to claim 1, wherein a part of the sidewall is formed as a bulge portion, the bulge portion bulging outwardly in a vehicle-width direction, and the oil filter is disposed at a front of a front sidewall of the bulge portion, the oil filter being disposed adjacent to the front sidewall.

3. The oil filter disposition structure of the saddle-ride vehicle according to claim 1, wherein the oil filter is mounted to an oil filter mounting portion wherein a portion of the oil filter is fitted within a recess providing a gap and the recess is formed at a front half portion of a left sidewall of a left crankcase half body.

* * * * *